(12) United States Patent
Knapp

(10) Patent No.: US 10,337,833 B2
(45) Date of Patent: Jul. 2, 2019

(54) METHOD AND SYSTEM FOR THE ACQUISITION OF HIGH-ACCURACY COORDINATE INFORMATION WITHOUT THE USE OF DIRECTED ELECTROMAGNETIC RADIATION

(71) Applicant: Stephen David Knapp, Snoqualmie, WA (US)

(72) Inventor: Stephen David Knapp, Snoqualmie, WA (US)

( * ) Notice: Subject to any disclaimer, the term of this patent is extended or adjusted under 35 U.S.C. 154(b) by 628 days.

(21) Appl. No.: 14/622,909

(22) Filed: Feb. 15, 2015

(65) Prior Publication Data
US 2015/0233712 A1 Aug. 20, 2015

Related U.S. Application Data

(60) Provisional application No. 61/941,976, filed on Feb. 19, 2014.

(51) Int. Cl.
*G01S 5/16* (2006.01)
*F41G 3/06* (2006.01)
*G01C 15/00* (2006.01)
*F41G 3/02* (2006.01)

(52) U.S. Cl.
CPC ............ *F41G 3/06* (2013.01); *F41G 3/02* (2013.01); *G01C 15/00* (2013.01); *G01S 5/16* (2013.01)

(58) Field of Classification Search
None
See application file for complete search history.

(56) References Cited

U.S. PATENT DOCUMENTS

| | | | | |
|---|---|---|---|---|
| 4,321,601 A * | 3/1982 | Richman | ............. | G01S 13/9023 342/191 |
| 5,440,392 A * | 8/1995 | Pettersen | ............... | G01B 11/00 356/601 |
| 5,920,278 A * | 7/1999 | Tyler | ......................... | G01S 5/14 342/140 |
| 6,950,060 B1 * | 9/2005 | Klein | ................... | B64G 1/1085 342/358 |
| 6,963,727 B2 * | 11/2005 | Shreve | ..................... | H04B 1/69 375/E1.001 |
| 7,479,920 B2 * | 1/2009 | Niv | ........................ | G01S 13/50 342/176 |
| 2014/0129170 A1 * | 5/2014 | Ramachandran | ....... | G01P 21/00 702/93 |
| 2014/0205205 A1 * | 7/2014 | Neubauer | .............. | H01Q 1/125 382/291 |

* cited by examiner

*Primary Examiner* — Sunit Pandya

(57) ABSTRACT

A method for providing highly accurate coordinates and elevation of a remote terrestrial-based location is described. The method also provides for the determination of a number of high-accuracy values including the location and elevation of the point of observation, and the distance and bearing from the point of observation to the remote location. Also described is a method for compensating for unknown effects of the associated atmospheric refractivity, and errors in input data.

5 Claims, 4 Drawing Sheets

Bearing variance due to positional change

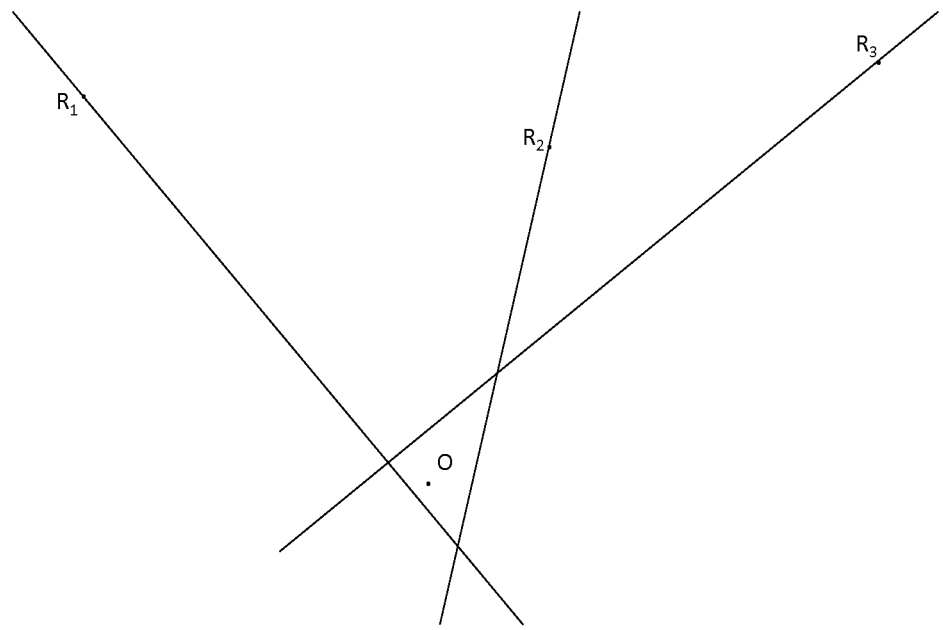
Fig. 1 – Standard triangulation error
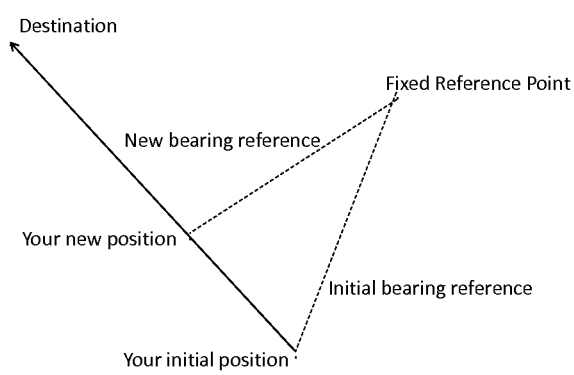
Fig. 2 – Bearing variance due to positional change

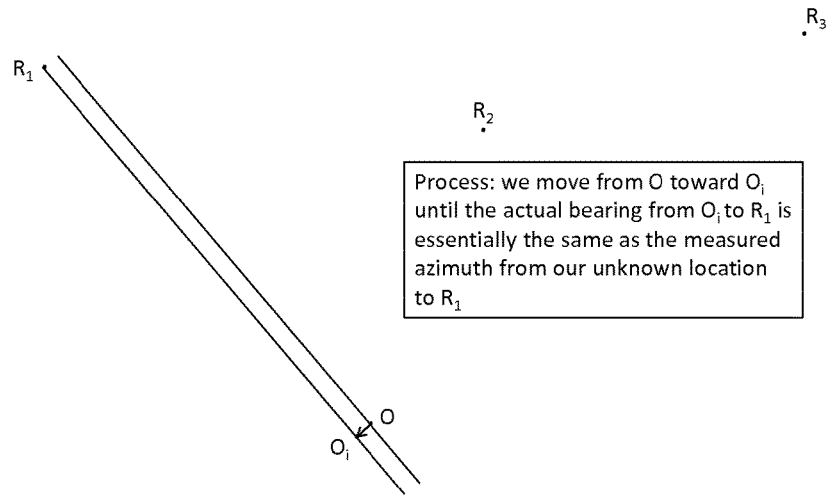
Fig. 3 – Determining the point closest to O that intersects the line coming from $R_i$.
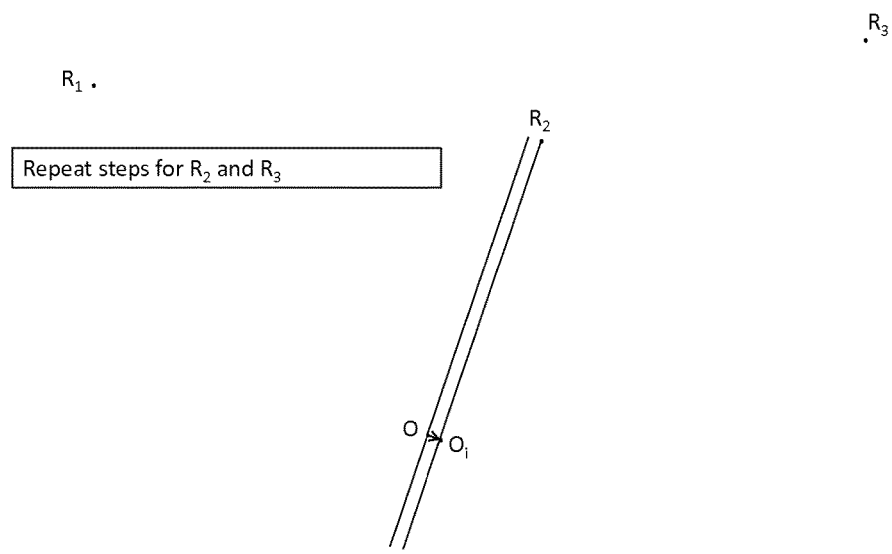
Fig. 4 – Illustrates repeating step (5) for the second reference point

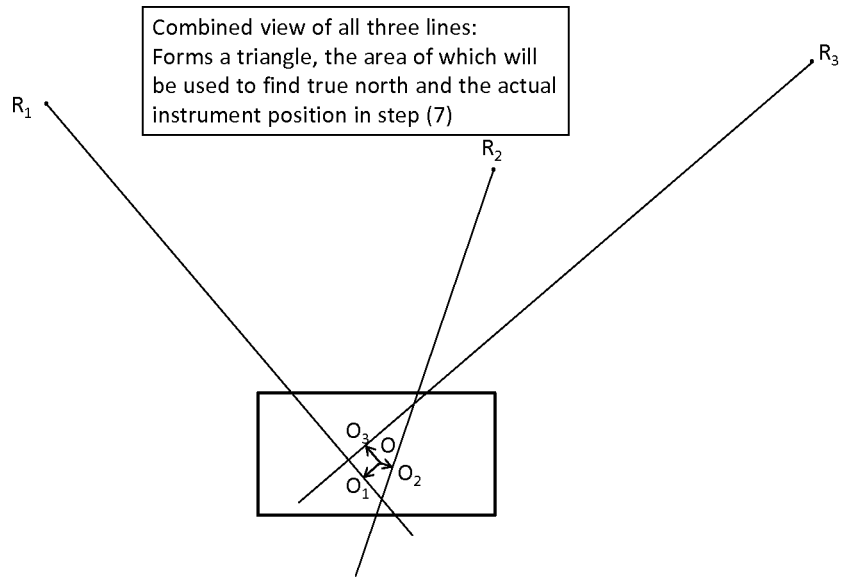
Fig. 5 – Depicts the final result of steps (5) and (6)
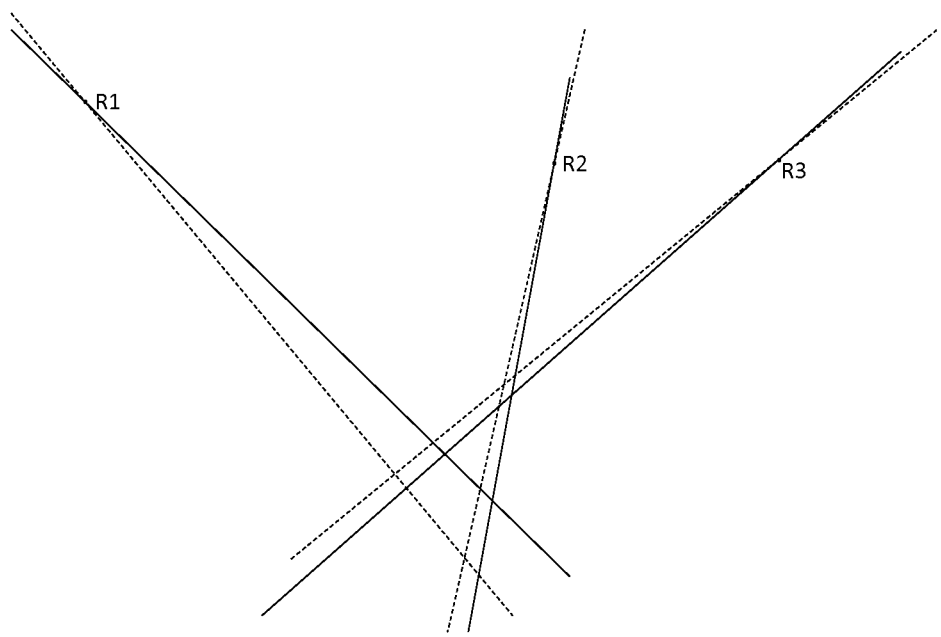
Fig. 6 – Depicts how the measured azimuth angles change in step (7)

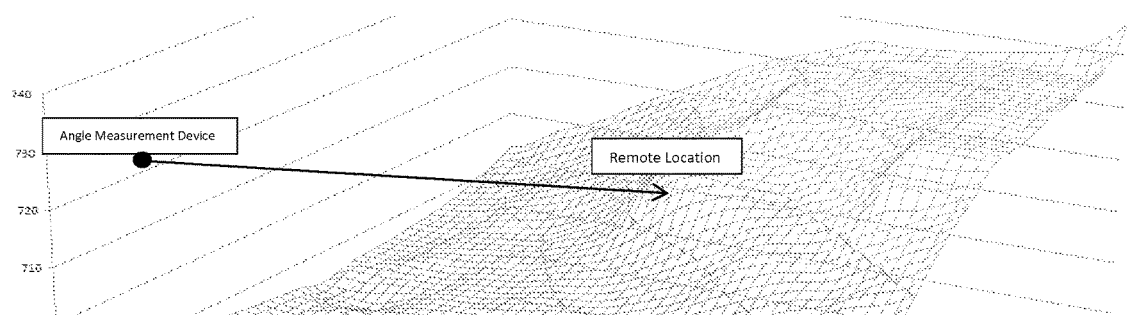
Fig. 7 – Angle measurement device is used to identify the coordinates of a remote location

METHOD AND SYSTEM FOR THE ACQUISITION OF HIGH-ACCURACY COORDINATE INFORMATION WITHOUT THE USE OF DIRECTED ELECTROMAGNETIC RADIATION

CROSS-REFERENCE TO RELATED APPLICATIONS

This patent application claims the benefit of an earlier filing date as granted under 35 USC § 119(e) by claiming the invention from the provisional patent application No. 61/941,976 filed on Feb. 19, 2014. The referenced provisional application is incorporated herein by reference.

BACKGROUND OF THE INVENTION

In the field of endeavor in which this invention pertains, it is common to use a device that emits directed electromagnetic radiation such as a laser rangefinder accompanied by orientation equipment such as a compass to identify the location of a remote object on a map. This technique has multiple limitations, including a limited range of use and ease of detection by a device at the remote location.

The invention described herein, by not using directed electromagnetic radiation, can provide a much further range of use and is very difficult to detect when used at large distances. Rather than being limited to a distance of a few miles for laser-based devices, this invention provides the capability to identify the coordinates of a remote terrestrial location as far away as an operator can see via an optical device, and with much higher accuracy than existing shorter-range devices when measuring remote locations within the range of a given existing device.

BRIEF SUMMARY OF THE INVENTION

The invention, also known as the Passive Coordinate Acquisition System (PCAS) is a method and system for determining an operator's current location and remote location with a high degree of accuracy. The named invention includes an angle measurement device, such as a "total station" (standard survey instrument), and a computer such as a smart phone or tablet referred to in this document as the "smart device." The instrument sends angle data to the smart device, which performs the necessary calculations to accurately determine position information.

The invention involves the use of aerial imagery and terrain data. In the described embodiment, the operator first calibrates the system using three reference points. That calibration sequence establishes the location and elevation/altitude of the instrument with a high degree of accuracy, given that the input data (such as the imagery and terrain data) is highly accurate as well. The calibration also establishes the direction of true north with a high degree of accuracy (typically within a few arc seconds or less, depending on the quality of the inputs).

Once the system has been calibrated, the operator can align the crosshairs of the telescope on the instrument with any distant object contacting the terrain, and the system will immediately provide the coordinates and elevation for that object. The smart device also displays the aerial imagery of the location where the telescope is pointing, so the operator can see where on the map the object resides—crosshairs on the map depict the object's location. The system updates the map immediately upon movement, so that as the operator redirects the telescope, the map on the smart device skews to the new remote location. The aerial imagery and the terrain data are pre-loaded onto the smart device so that it is available to the operator when operating in areas without network connectivity.

Although there are multiple technologies that provide an operator with remote target information, there are no other technologies, to my knowledge, that can determine target locations without the use of electromagnetic radiation with the speed and accuracy of the named invention. For instance, some aircraft-mounted telescopes can provide rough target coordinates quickly, but they are only useful for identifying approximate remote locations. And while laser-based range-finding equipment is useful for illuminating or identifying a target with high accuracy, it cannot identify the target's coordinates with high accuracy nor can it operate without emitting laser radiation that can be detected by sensors at the remote location. Depending on the application, this could result in deployment of countermeasures or even a counter-attack.

The named invention makes it possible for the operators to both remain undetected if necessary, and to identify a remote location with more accuracy than other systems, and at a much greater distance than existing technology. It is only limited by the accuracy of the input data, and the ability for the operator to identify the target. So for instance, if an operator needs to determine the coordinates of a building that is 50 miles away, the operator only needs to point the telescope at the building (or the terrain beneath the building), and the smart device will immediately display the coordinates. This can be substantially faster than poring over aerial imagery without the aid of the named invention.

BRIEF DESCRIPTION OF THE DRAWINGS

FIG. 1 illustrates standard triangulation error

FIG. 2 shows bearing variance due to positional change

FIG. 3 illustrates how to determine the point closest to origin that matches the azimuth FIG. 4 shows how to find the closest point for the other two reference points FIG. 5 illustrates how to find the coordinates of the origin FIG. 6 depicts how measured azimuth angles change while finding the azimuth offset FIG. 7 shows a device identifying the coordinates of a remote location

DETAILED DESCRIPTION OF THE INVENTION

The following description is illustrative of the principles comprising the invention. The inventor has envisioned other ways that the invention might be embodied, and the details described herein are not intended to limit the scope of the claims of this patent, which explicitly describe the essential features of the invention.

I. Determining Position and Bearing to True North with High Precision Via Triangulation In general, there is no novelty in using triangulation to acquire information about a given location. This invention uses a method for triangulation that can provide immediate position information with an accuracy greater than or equal to that provided by the Global Positioning System or other similar systems. An additional advantage is that it allows the calculation of true north to an accuracy of a few arc-seconds or better, depending on the quality of the input data. This method can provide more accuracy for bearing calculation than some existing methods by a factor of two or three orders of magnitude.

In standard triangulation with a map and compass, a navigator might take a bearing to three reference points that are identifiable on a map, such as the tops of nearby mountains. Then on the map, the navigator draws a line starting from each point, traveling along the "back bearing" (the reverse direction, i.e. the measured bearing+180 degrees modulo 360). Because the absolute bearing measured by most compasses is only accurate to about one to three degrees (and less accurate in areas with ferrous material in the earth, or where other nearby metal objects are present), there can be a significant margin of error, and the navigator can end up with a large triangle where the lines intersect on the map rather than an essentially single point of intersection. The triangle (or circle) defined by the three intersection points can cover a good percentage of a township. It's enough to roughly get you where you're going, but it is nothing like using GPS.

FIG. 1 depicts the construction of a triangle based on inaccurate back bearings. In the figure, the three reference points are identified by $R_1$, $R_2$ and $R_3$, and the actual location of the navigator is identified by O (for origin).

For high accuracy and/or long distance calculations, it cannot simply be assumed that the back bearing is the opposite direction of the reading displayed on the compass face. As you move along the shortest path to a destination point, your absolute bearing changes due to your changing angular relationship to true north (or any other fixed reference point that differs from the destination). So your initial bearing might be 37 degrees, but your final bearing might be 38 degrees if you travel far enough. The back bearing in this case is 38+180=218 degrees, not 37+180=217 degrees. Even traveling a few hundred yards can cause the bearing to change enough to make a measurable difference in the calculation.

FIG. 2 depicts the variation in absolute bearing due to change in position. As a navigator moves from an initial position toward a destination, the angular relationship between the navigator's heading and the fixed reference point changes.

These challenges are compounded by the fact that the navigator's exact position is unknown, so it is not possible for them to simply calculate the back bearing from each reference point with a high degree of accuracy. Since the navigator doesn't know where true north is exactly, they can't measure the actual bearing to each reference point with significant precision. The only things one can know with high precision are the angles between the measured bearings to the reference points and the coordinates of the reference points (using high resolution aerial imagery or other mechanism).

Because of these limitations, the following steps illustrate one way to determine one's location:

1. The current location O is approximated from general knowledge of the region or via a system such as GPS or GLONASS.
2. The locations of three selected (visible) reference points $R_i$ are determined from an external source, such as accurate aerial imagery of the region. These reference point locations are known to be accurate.
3. The angle measurement instrument is calibrated by pointing it to approximate true north and zeroing the azimuth setting. (Note that the azimuth may be many degrees off of actual true north, and the algorithm will still work.) True north may be approximated by combining the magnetic north reading with the approximate magnetic declination for the assumed instrument location O.
4. The azimuth angles to each of the three selected reference points are measured relative to the instrument calibration value obtained in step 3. During each iteration of steps 5 through 7, these measured azimuth angles and the instrument calibration are assumed to be accurate.
5. For each reference point $R_i$
   a. The actual initial bearing to $R_i$ is computed from the assumed current location and compared to the measured azimuth to that point.
   b. If the difference between the two angles is greater than a desired epsilon value, an updated location $O_i$ is estimated that lies along a line formed by the bearing to $R_i$+/−90 degrees (modulo 360), where the +90 or −90 direction selected is that which reduces the difference between the angles. This step is repeated until the difference between the computed azimuth from $O_i$ to $R_i$ and the measured azimuth (from estimated true north) is smaller than the desired epsilon value (i.e. the angles are as close to each other as is needed for the desired level of accuracy). FIG. 3 and FIG. 4 depict this step.
6. Following step 5, the points $O_i$ nearest to the approximated current location and lying on the computed back bearing lines from the reference points are known. These three points form a triangle whose area is computed. This is depicted in FIG. 5.
7. Vary the measured azimuth angles to each of the reference points by a common value and repeat steps 5 and 6 until the triangle with the smallest area is found. The iteration is performed until the difference between the computed triangle areas from successive iterations is smaller than a desired epsilon value (e.g. 0.01 square yards). In other words, iteration stops once the triangles are not getting significantly smaller. It is assumed that the computed triangle area is the best measure of uncertainty in estimating the current instrument location. This step is depicted in FIG. 6. Note how one triangle is significantly smaller than the other.
8. The centroid of the final triangle is used to approximate the current instrument location. Other methods can be used as well, such as determining the intercenter, circumcenter, or orthocenter of the triangle (or other similar approaches), or by finding the center of the circle that intersects the vertices. The azimuth offset is the final azimuth (adjusted by deltas) to one of the reference points minus the original measured azimuth to that point. The azimuth offset is used to adjust future measured azimuths so that they are highly accurate in relation to true north. The azimuth differences for each reference point can also be averaged together to calculate an azimuth offset that is most applicable to the scenario, given any errors that might have been introduced when the aerial imagery was mapped to the coordinate grid.
9. The elevation of the instrument may be determined by the elevation angles to each of the reference points (known locations/elevations), compensating for estimated atmospheric refractivity and the curvature of the earth. The elevation angles to the reference points are averaged, so that the most accurate estimate of instrument elevation can be determined.

II. Finding the Coordinates of a Distant Location Based on Terrain Data

Once you know your location, elevation, and azimuth offset to true north, either via method 1 above or another method, you can point the instrument's telescope at a distant location and determine the coordinates of that distant location by following the line of sight until you hit terrain, as illustrated in FIG. 7.

This method iterates by advancing along the line-of-sight in pre-defined increments that vary in size based on the altitude of the iteration above the ground as it is "in flight", moving toward the terrain. The higher the iteration is above ground at any given point along the "flight path", the larger the increment, because there is less risk of advancing "through" a small hill or object along the line-of-sight path without it registering as a "hit". When the iteration is only a short distance above the ground, a smaller increment per iteration is used due to the increased probability of "missing" terrain when the instrument is pointed at the very top of a hill or other object.

By varying the increments, the number of total calculations is reduced, and less processing is required, reducing required CPU size and/or battery consumption. Also, moving along the "flight path" toward terrain is a description designed to help humans understand the process. In the software, the points may be calculated in any order, and multiple processors may be used to significantly reduce the time it takes to perform the calculations.

Once you "hit terrain", your remote location is underground or inside an object, so you have to iteratively backtrack until you reach the surface of the terrain, performing a binary search until you achieve the desired precision. At that point, you simply report the coordinates of that location, and it is displayed on the map.

III. Compensating for Poor Elevation Sampling Data

When elevation data is collected, error in the instruments used for collection, and especially differences in calibration between multiple independent instruments used for collection can cause a significantly different relative elevation measurement in two disparate areas. Since PCAS depends on accurate elevation data to determine the coordinates of distant locations, being able to correct for discrepancies in elevation correction in different areas can help increase the accuracy of the system.

The following is the method for compensating for these discrepancies:
1. When the instrument is pointed at a distant location, and the map is displaying a slightly different location on the imagery, the user can manually move the map to match what is seen through the instrument.
2. Because PCAS can measure the elevation at a given point relative to other points it knows about, the reported elevation is subtracted from the elevation measured by PCAS to determine an offset to be applied to all subsequent measurements in the vicinity of that point.
3. When multiple offsets are calculated for various points throughout a region, the offset between points consists of a weighted average of the offsets based on their respective proximities to points that already have recorded offsets. For example, if the remote point is between two known correction points, the amount of correction can be determined by taking the weighted average based on how close the remote location is to each point. Alternately, if the target is beyond either correction point, the target correction could be the same as that of the nearest correction point. Other options have been used as well, such as weighting the elevation correction when the target is between three points that form a triangle. The exact weighting method is not as important as the fact that some weighting method is used to provide a correction factor for the target area. Another consideration is that whatever weighting approach is used, it is ideal if there are no sharp edges in the correction engine. For instance, if the target crosses a boundary where two different correction points are now in range, the correction value shouldn't just jump to a significantly different value. That's where using a triangle or other multi-sided polygon can be useful. Note that in this case, these polygons are projected onto the surface of the ellipsoid, so they aren't true polygons in that they have curved surfaces.

This method of compensation does not provide a way of determining the absolute elevation for any given location, but it ensures that the relative elevation is as close as possible to the rest of the region, so that further observations can be made with less error than would otherwise be present.

IV. Compensating for Inconsistent Mapping of Aerial Imagery to the Coordinate Grid When aerial imagery is captured and mapped to the coordinate grid, it may not line up exactly with the coordinate grid. So when multiple disparate samples are combined to make a seamless map, the seams do not always line up, and it is necessary to compensate for the disparate mapping of imagery.

This method is similar to the previous method, except that instead of calculating an elevation offset, it calculates an offset to the instrument location:
1. When the instrument is pointed at a distant location, and the map is displaying a slightly different location on the imagery, the user can manually move the map to line it up with what is seen through the instrument.
2. Because PCAS can measure the distance and bearing by which the user moved the map, it offsets the instrument location by the same distance and bearing and applies that offset to all subsequent measurements in the vicinity of that point.
3. When multiple offsets are calculated for various points throughout a region, the offset between points consists of a weighted average of the offsets based on their respective proximities to points that already have recorded offsets. The same methodologies used for elevation correction weighting can be employed to determine instrument location offset.

In this manner, the effective instrument location moves around slightly as you point the telescope at different regions. In effect, the instrument adopts the coordinate grid mapping of the imagery at the distant location rather than the mapping at its own location.

V. Compensating for Unknown Variables that Affect Atmospheric Refractivity

Atmospheric refractivity depends on many variables, such as the wavelength of light, temperature, humidity, pressure, altitude, $CO_2$ content, and particle density. Some of these variables cannot feasibly be measured at any location other than at the instrument, but their values change along the line of sight between the instrument and the distant location. This causes the map to display coordinates that are either closer or further than where the telescope on the instrument is actually pointing. Some variables can be compensated for by methods such as calculating the altitude at various points along the line of sight, estimating the temperature gradient along the line of sight based on altitude, and assuming that relative barometric pressure does not change along the line of sight (or by incorporating readings from weather stations near a target).

To compensate for the unknown aspects of atmospheric refractivity, we employ the same method described in Section 3 for compensating for errors in elevation data. By doing this, both elevation and atmospheric refractivity are compensated for precisely at the distant location.

There are two effects of this approach: 1) the elevation data is corrected for the whole region in which the elevation data is relatively correct (relative as opposed to absolute), and 2) atmospheric refractivity is corrected for precisely at the distant location. However, moving away from the distant location (where atmospheric refractivity has been corrected for) increases the error due to the unknown atmospheric refractivity. It is therefore a good idea to perform this correction at a distant location that is in the vicinity of the distant location whose coordinates are desired to be known when the highest degree of accuracy is desired.

The invention claimed is:

1. A method of determining coordinates of a remote location based on where a shortest line-of-sight path from an angle measurement device intersects the terrain at a remote location within view of a scope of an angle measurement device, comprising the steeps of:
   a) identifying a point, using a computing device to obtain azimuth and elevation (altitude) angles of the scope from the angle measurement device and perform calculations to accurately determine position of the remote location, that is substantially on the shortest line-of-sight path which starts at the scope of the angle measurement device and traverses the remote location;
   b) determining whether the point from step a) is above or below the surface of the terrain at that location;
   c) repeating steps a) and b) until a point from step a) has been identified for which the distance between the point and the surface of the terrain is less than a selected value.

2. A method of determining the location and orientation of the angle measurement device of claim 1, comprising the steps of:
   a) calibrating the angle measurement device such that the zero degree azimuth angle is oriented toward a reference direction such as north;
   b) for each of three remote reference points, calculating locations near the angle measurement device such that the bearings of the shortest paths from each of these locations to each reference point are substantially equal to as the azimuth angles measured by the angle measurement device when it is pointing at each reference point respectively;
   c) repeating step b), applying positive and negative angle offsets to the measurements from the angle measurement device until the area of the geometric object created by the intersection of the shortest paths from step b) is smaller than a selected value, or until the differences between the bearings and measured angles with applied offsets are smaller than a selected value;
   d) calculating a central location near the intersections of the three shortest paths from step b) which represents the determined location of the angle measurement device, and applying the desired angle offset from step c) which when combined with the measured angle from the angle measurement device represents the determined orientation of the angle measurement device relative to the reference direction from step a).

3. A method of adjusting for errors in terrain surface measurements of claim 1 comprising the steps of:
   a) obtaining the coordinates of a remote location via an angle measurement device;
   b) obtaining the coordinates of a remote location on an aerial imagery map that is substantial the same as the remote location from step a);
   c) calculating the elevation of the remote location based on the altitude angle measured by the angle measurement device and the relative locations of the angle measurement device and the remote location;
   d) subtracting the elevation of the coordinates in step b) from the measured elevation calculated in step a) to determine an elevation offset;
   e) applying the elevation offset to subsequent measurements by the angle measurement device, resulting in measured coordinates that have been adjusted for errors in terrain surface measurements.

4. A method for compensating for unknown variables that affect atmospheric refractivity of claim 1 comprising the steps of:
   a) obtaining the coordinates of a remote location via an angle measurement device;
   b) obtaining the coordinates of a remote location on an aerial imagery map that is substantially the same as the remote location from step a);
   c) calculating the elevation of the remote location based on the altitude angle measured by the angle measurement device and the relative locations of the angle measurement device and the remote location;
   d) subtracting the elevation of the coordinates in step b) from the measured elevation calculated in step a) to determine an elevation offset;
   e) applying the elevation offset to subsequent measurements by the angle measurement-device, resulting in measured coordinates that have been adjusted for unknown variables that affect atmospheric refractivity.

5. A method for combining multiple elevation offsets of claim 3 comprising the steps of:
   a) calculating a weighted average of the elevation offsets of claim 3 based on the proximity of the remote location to the coordinates for which each elevation offset was calculated;
   b) using the weighted average of the elevation offsets from step a) as a replacement for the elevation offset of claim 3 step e), so that the weighted average of the elevation offset is used in subsequent measurements instead of a single elevation offset.

* * * * *